US010311355B1

(12) United States Patent
Hahn et al.

(10) Patent No.: US 10,311,355 B1
(45) Date of Patent: Jun. 4, 2019

(54) RFID TAGS

(71) Applicant: Amazon Technologies, Inc., Seattle, WA (US)

(72) Inventors: Camerin Cole Hahn, Redmond, WA (US); Matthew Perkins, Shoreline, WA (US); Nikolai Orlov, Toronto (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/086,855

(22) Filed: Mar. 31, 2016

(51) Int. Cl.
*G06K 19/077* (2006.01)
*G06K 19/02* (2006.01)

(52) U.S. Cl.
CPC ... *G06K 19/07794* (2013.01); *G06K 19/0776* (2013.01)

(58) Field of Classification Search
CPC .......... G06K 19/02; G06K 5/00; G06K 19/00; G06F 17/00
USPC ................. 235/488, 375, 380, 487
See application file for complete search history.

(56) References Cited

U.S. PATENT DOCUMENTS

| 5,241,299 | A |   | 8/1993  | Appalucci et al. |
|-----------|---|---|---------|------------------|
| 5,442,334 | A |   | 8/1995  | Gallo et al.     |
| 6,130,648 | A | * | 10/2000 | Rulf ........................ H01Q 13/10 |
|           |   |   |         | 343/767          |
| 7,535,366 | B2|   | 5/2009  | Egbert           |
| 9,235,928 | B2|   | 1/2016  | Medioni          |
| 9,473,747 | B2|   | 10/2016 | Kobres           |

| 2004/0140934 | A1 | * | 7/2004 | Korva ..................... H01Q 1/243 |
|              |    |   |        | 343/700 MS |
| 2006/0054710 | A1 | * | 3/2006 | Forster .................... H01Q 1/22 |
|              |    |   |        | 235/492 |
| 2008/0068175 | A1 | * | 3/2008 | Hockey .............. G06K 19/0726 |
|              |    |   |        | 340/572.7 |
| 2009/0109035 | A1 | * | 4/2009 | Subramanian ....... G08B 13/242 |
|              |    |   |        | 340/572.8 |
| 2009/0128446 | A1 | * | 5/2009 | Gummalla ............... H01Q 1/38 |
|              |    |   |        | 343/911 R |

(Continued)

FOREIGN PATENT DOCUMENTS

WO    WO2008076561 A2    6/2008

OTHER PUBLICATIONS

Brocato, "Passive Microwave Tags", Sandia National Laboratories, Oct. 2004, 30 pages.

(Continued)

*Primary Examiner* — Edwyn Labaze
(74) *Attorney, Agent, or Firm* — Lee & Hayes, P.C.

(57) ABSTRACT

This disclosure describes RFID tags that include capacitive shields to capacitively couple with antennas of the RFID tags when exposed to threshold levels of electromagnetic energy, such as when placed in a microwave. In some instances, these capacitive shields comprise a material that is both thermally conductive and electrically conductive. When exposed to electromagnetic energy of a high frequency, the capacitive shield may capacitively couple to the antenna of the RFID and, thus, may receive energy from the antenna. Given the properties of the capacitive shield, the capacitive shield may convert this energy into thermal energy and dissipate this heat into an ambient environment of the RFID tag. By doing so, the capacitive shield lessens the risk that dangerous arcing will occur from the electromagnetic energy.

19 Claims, 8 Drawing Sheets

(56) References Cited

U.S. PATENT DOCUMENTS

| | | | |
|---|---|---|---|
| 2009/0243781 A1* | 10/2009 | Nomura | H01F 17/0013 336/200 |
| 2010/0134291 A1* | 6/2010 | Lavedas | G06K 19/07749 340/572.7 |
| 2010/0141452 A1 | 6/2010 | Lian et al. | |
| 2011/0139880 A1* | 6/2011 | Yamazaki | G06K 19/04 235/492 |
| 2012/0092220 A1* | 4/2012 | Tani | H01Q 1/38 343/702 |
| 2012/0149257 A1* | 6/2012 | Malervy | C25D 5/10 439/886 |
| 2013/0284806 A1 | 10/2013 | Margalit | |
| 2014/0014732 A1* | 1/2014 | Finn | G06K 19/077 235/492 |
| 2014/0144992 A1* | 5/2014 | Diorio | G06K 7/10297 235/488 |
| 2014/0145906 A1* | 5/2014 | Kato | H01Q 7/00 343/867 |
| 2014/0375524 A1* | 12/2014 | Nago | H01Q 7/00 343/866 |
| 2015/0136856 A1* | 5/2015 | Herslow | G01B 7/06 235/488 |
| 2016/0148027 A1 | 5/2016 | Schoutens | |
| 2016/0172760 A1* | 6/2016 | Brown | G01V 15/00 343/772 |

OTHER PUBLICATIONS

Office action for U.S. Appl. No. 14/788,302, dated Jul. 21, 2017, Keller et al., "RFID Tags", 8 pages.

Office action for U.S. Appl. No. 14/788,302, dated Nov. 29, 2017, Keller et al., "RFID Tags", 8 pages.

Office Action for U.S. Appl. No. 14/788,302, dated Aug. 24, 2018, Kevin E. Keller, "RFID Tags", 7 pages.

\* cited by examiner

RFID TAGS

BACKGROUND

Radio frequency identification (RFID) represents the wireless use of electromagnetic fields to transfer data for the purpose of identifying and tracking RFID tags, which may be attached to objects being monitored and/or tracked. In some instances, RFID tags comprise passive tags that receive power via electromagnetic induction from magnetic fields produced by an RFID reader. In other instances, RFID tags comprise active tags that include their own power source. In either instance, RFID tags typically include a metal antenna or trace. As such, undesirable electric arcing may occur in an RFID tag when a certain amount of electromagnetic energy is applied to the tag.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
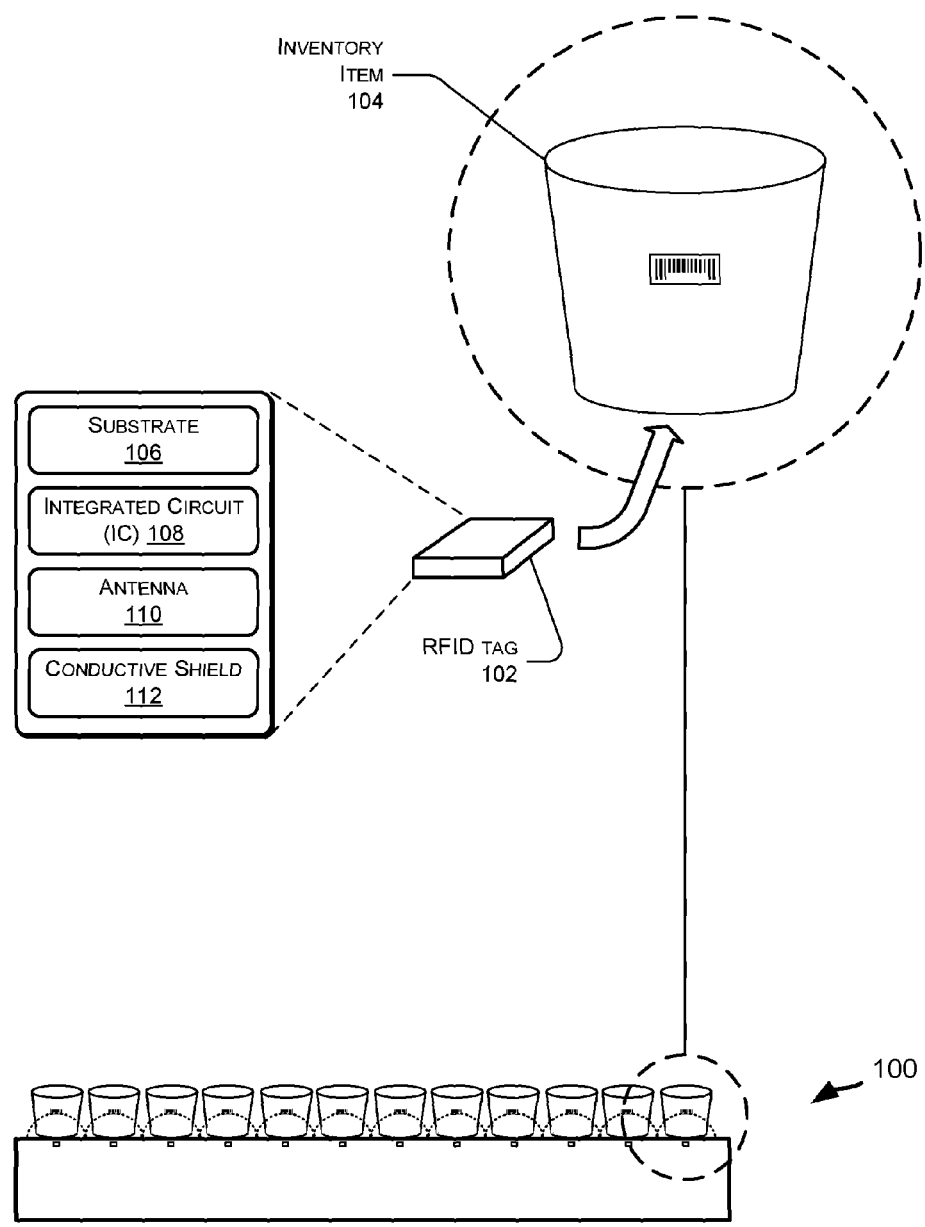
FIG. 1 shows an example RFID tag that includes a capacitive shield and is coupled to a microwaveable food item. The capacitive shield does not affect functionality of an antenna of the RFID tag at frequencies used by RFID readers, while capacitively coupling to the antenna at much higher frequencies. Therefore, when a user heats the food item in a microwave the capacitive shield may receive electromagnetic energy from the antenna and covert this energy into thermal energy such that the thermal energy dissipates from the capacitive shield into an ambient environment of the RFID tag, thus preventing arcing at the antenna.

This disclosure describes RFID tags that include capacitive shields to capacitively couple with antennas of the RFID tags when exposed to threshold levels of electromagnetic energy, such as when placed in a microwave. In some instances, these capacitive shields comprise a material that is both thermally conductive and electrically conductive (e.g. having electrical conductance that is greater than approximately $1.00 \times 10^7$ Siemens at 20° Celsius). When exposed to electromagnetic energy of a high frequency (e.g., >1 Gigahertz for instance), the capacitive shield may capacitively couple to the antenna of the RFID and, thus, may receive energy from the antenna. Given the properties of the capacitive shield, the capacitive shield may convert this energy into thermal energy and dissipate (e.g., radiate, conduct, etc.) this heat into an ambient environment of the RFID tag. By doing so, the capacitive shield lessens the risk that dangerous arcing will occur from the electromagnetic energy. For instance, if such an RFID tag were placed and heated in a microwave, the capacitive shield may capacitively couple to the antenna of the RFID tag and significantly reduce the chances that the antenna will arc as compared to a traditional RFID tag.

Further, in some instances the capacitive shield does not interfere with the functionality of the antenna and the RFID tag as a whole at lower frequencies (e.g., >50 Megahertz), such as frequencies utilized by RFID readers that send polling or other types of signals to the RFID tag. Thus, the capacitive shield may function to make the resulting RFID tag safe in high-frequency environments (e.g., an operating microwave) while not affecting the intended functionality of the RFID tag (e.g., being read by an RFID reader).

The capacitive shield may be formed from an array of materials, such as metals (e.g., copper, nickel, aluminum, etc.), silicon, germanium, carbon, a conductive-particulate glue, or other materials having an electrical conductance that is greater than an electrical-conductance threshold (e.g., greater than approximately $1.00 \times 10^7$ Siemens at 20° Celsius). In some instances, the selected material may also have a thermal conductance that is greater than a thermal-conductance threshold.

The capacitive shields described herein may have a shape that allows for capacitive coupling between the capacitive shields and RFID-tag antennas, while also reducing Eddy currents that could cause dangerous arcing in high-frequency environments. For instance, the capacitive shields may comprise a C-shape, a U-shape, a G-shape, an H-shape, two U-shapes that are mirror images of one another, a shape having a substantially resemblance to a "C", "U", "G", "H", or the like. In each instance, a capacitive shield may include a slot that defines a recess in the capacitive shield, potentially along with a window that comprises a larger recess than the slot. For instance, a C-shaped capacitive shield may have a window in the middle of the shield, as well as a slot leading into the window. The slot and/or window may function to reduce Eddy currents formed by high-frequency electromagnetic energy.

In some instances, material of the capacitive shield may align, in part, with the RFID-tag antenna. That is, RFID-tags antennas may be disposed on a substrate in a spiral pattern, thus resulting in multiple "loops" of the antenna. A jumper may couple together a first end of the antenna with a second end of the antenna, thus closing the circuit. Further, and as illustrated and discussed below, the loops of the antenna may reside towards a perimeter of the substrate of the RFID tag, thus leaving a middle portion of the substrate free from portions of the antenna. Regardless of a side of the RFID tag on which the capacitive shield couples, material of the capacitive shield may align with or correspond to the loops of the antenna. That is, the "C" or "U" of the C-shaped or U-shaped capacitive shield may reside underneath (or above) the loops of the antenna. Further, the slot in the "C", "U", or other otherwise-shaped capacitive shield may also correspond to a portion of the antenna, such that the capacitive shield does not align with (e.g., reside above or underneath) an entirety of the spiral pattern of the antenna. This alignment may allow for ideal capacitive coupling, while reducing the chances that the capacitive shield and the antenna themselves creating a short circuit.

In some instances, an RFID tag described herein describe a substrate having a top surface and a bottom surface. The antenna of the RFID tag may couple to the top surface of the substrate via a first adhesive layer. The capacitive shield, meanwhile, may couple to the bottom surface of the substrate via a second adhesive layer. By positioning the substrate between the antenna and the capacitive shield, the capacitive shield may capacitively couple to the antenna at high-frequencies while not doing so at lower frequencies, thus not disrupting functionality of the antennas at the lower frequencies. That is, the resulting RFID tag does not affect the functionality of the RFID tag in its normal operating environment (e.g., in which the RFID tag communicates with an RFID reader), but reduces the chances that the RFID tag will arc dangerously in a high-frequency environment.

In still other instances, the capacitive shield may reside atop the substrate along with the antenna. In these instances, an insulating layer may reside between the antenna and the capacitive shield such that the capacitive shield does not short out the antenna at the lower frequencies, while still allowing the capacitive shield to capacitively couple to the antenna at the higher frequencies. In these instances, the antenna may reside atop the insulating layer, which may reside atop the capacitive shield, which may reside atop the typical RFID substrate. In other instances, the capacitive shield may reside atop the insulating layer, which may reside atop the antenna, which may reside atop the RFID substrate. Further, in some instances, an RFID tag may include two capacitive shields, with a first capacitive shield residing on the top surface of the RFID substrate (with an insulating layer atop the first capacitive shield to avoid shorting out the antenna) and a second capacitive shield residing on the bottom surface of the RFID substrate.

In some examples, RFID tags may couple to inventory items for tracking these items. In some implementations, the RFID tag may adhere to an inventory item while in other instances the RFID tag may be integral with a container of the inventory item. In some instances, multiple inventory items may reside in a common area, such as on a shelf of a store such that customers may obtain (i.e., "pick") these items from the shelf. An RFID reader may periodically or continuously send signals to and receive signals from the RFID tags coupled to the items for monitoring a population of the items. For instance, envision that ten inventory items that each include or are coupled to an RFID tag initially reside upon a shelf. When the RFID reader sends a signal to the RFID tags, all ten may receive the signal and may send a response back to the reader. Upon receiving a response from all ten RFID tags, the RFID reader may confirm that the population of items on the shelf remains at ten inventory items. However, after a user picks one of these items and the RFID reader sends a signal the population of tags, only nine RFID tags may receive the signal and send a response, given that the inventory item coupled to the tenth RFID tag has been picked and is out of range of the RFID reader. In response to receiving the nine responses, the RFID reader or another component of the system may determine that only nine items remain in the population of items on the shelf.

In another example, an RFID reader may reside on an edge of a shelf and may point generally upward, such that the RFID reader is able to "see" inventory items that are placed onto or removed from the shelf. That is, the RFID reader may send and receive signals generally upward such that the RFID reader is able to determine via the signals when a new inventory item is placed on the shelf or when an inventory item is removed from the shelf.

While the inventory items may comprise any sort of physical item capable of being picked, in certain instances the inventory items may comprise items designed to be exposed to electromagnetic energy. For instance, the inventory items may comprise a food item having a container configured to be microwavable by a user. A "food item" may include solids and/or liquids, such as pastas, soups, beverages, or the like.

When a user picks a microwavable food item and returns home with the item, the user may eventually place the item in the microwave. Furthermore, in instances where the item couples to the RFID tag (e.g., the RFID tag attaches onto a packaging of the item or the RFID tag is integral with the packaging), the RFID tag may also be placed in the microwave and, hence, exposed to electromagnetic energy. However, because RFID tags typically contain metal (e.g., the antennas), the metal portions of the RFID tags may arc and, hence, be unsafe in this environment.

To address at least this problem, the RFID tags introduced above and described further below may include the capacitive shields to capacitively couple to the metal portions of the antenna when exposed to electromagnetic energy of a frequency that is above a certain threshold, such as the electromagnetic energy experienced when heated in a microwave oven. These tags may affix to containers of microwavable food items or may be integrated with the containers of the microwavable food items. This capacitive coupling functions to decrease or prevent arcing when the inventory items and the corresponding RFID tags are subject to electromagnetic energy, such as when an item and corresponding tag are placed in a microwave oven.

FIG. 1 shows an example RFID tag 102 that is coupled to a microwaveable food item 104 and that is configured to safely dissipate heat rather than arc when exposed to threshold levels of electromagnetic energy. Because of this, arcing may avoided if a user were to heat the food item 104 in a microwave with the RFID tag 102 still coupled to the item.

An RFID tag, such as the tag 102, generally refers to a device with an antenna or resonator that can produce a wireless signal when activated or powered (e.g., may modulate a load that is read by an RFID reader). The wireless signal produced by the RFID tag 102 is typically low power, and intended for transmission over short distances. The RFID tag 102 may be formed of any material and may be flexible or rigid. For example, the RFID tag 102 may be an active RFID tag in which the RFID tag includes an internal power supply (e.g., battery), a passive RFID tag in which the RFID tag does not include a power supply and is activated by power supplied by an RFID reader, a battery-assisted RFID tag in which the RFID tag includes a power supply (e.g., a battery) but is activated by power supplied by an RFID reader, an active near field communication ("NFC") tag, a passive NFC tag, a Bluetooth tag, or any other type of tag that can be configured to provide an identifier over a radio frequency. Likewise, an RFID reader, as used herein, refers to any type of RFID reader that can communicate with, interrogate and/or receive information from an RFID tag.

Initially, FIG. 1 illustrates multiple microwavable food items located on an example inventory shelf 100. As illustrated, each inventory item 104 may couple to a respective RFID tag 102. The RFID tag 102 may physically attach to the item 104 after manufacture of the container of the item 104, or the tag 102 may be integral with the container itself. In either case, the RFID tag 104 may include, in some instances, a substrate 106, an integrated circuit (IC) 108, an antenna 110, and a capacitive shield 112. The antenna 110 may be formed of any suitable material typically used in RFID antennas. The antenna 110 may comprise a receiver to receive a signal from an RF reader and a transmitter to transmit a response to the signal to the RF reader. In some cases, the "transmitter" portion of the RFID tag comprises a decoder that decodes the signal from the RF reader and modulates a load to generate the response, with this modulated load being detected by the RFID reader and used to identify the tag. In some instances, the receiver and the transmitter may be integrated, forming a transceiver. The capacitive shield 112, meanwhile, may comprise a material having an electrical conductance that is higher than an electrical-conductance threshold and/or a thermal conductance that is higher than a thermal-conductance threshold.

The IC 108 may bond to the substrate 106 and may be configured to receive (via the antenna) power from the interrogating signal to power the RFID tag 102, demodulate the interrogating signal from an RFID reader, and modulate a response for transmission to the RFID reader via the antenna. The antenna 110, meanwhile, may also bond (e.g., via vapor deposition, electrolytic deposition, etc.) to the substrate and may be configured to receive an interrogating signal from the RFID reader and transmit a response to the interrogating signal to the RFID reader. As described above, the response may identify at least one of the RFID tag or the inventory item, thus allowing the RFID reader to determine that the tag and/or the item are still located on the inventory shelf 100. Also as discussed above, the antenna 110 and the capacitive shield 112 may capacitively couple to one another at frequencies above a certain frequency threshold, thus preventing arcing when absorbing the electromagnetic energy.

The capacitive shield 112 may couple to a top side or an underside of the RFID tag 100 (as illustrated) and may have a design that allows for the capacitive coupling at high frequencies while not "shorting out" the antenna (and, thus, not disrupting normal operation of the RFID tag). Further, the design of the shield 112 may be such so as to reduce potential Eddy currents that more form in high-frequency environments, such as the microwave. For instance, the capacitive shield 112 may be C-shaped, U-shaped, or the like. In each instance, the shape of the capacitive shield 112 may include at least a slot to reduce the Eddy currents. In addition, the slot may lead to a window comprising a larger opening and, similar to the slot, reducing the formation of potential Eddy currents at high frequencies. Several example capacitive shields are illustrated and discussed below with reference to FIGS. 2-6. It is to be appreciated, however, that these examples are merely illustrative, and that other implementations may utilize other shapes. It is further to be appreciated that the capacitive shield may additional or alternatively reside on a top surface of the RFID tag, with an insulating layer residing between the antenna and the capacitive shield.

Figure 2:
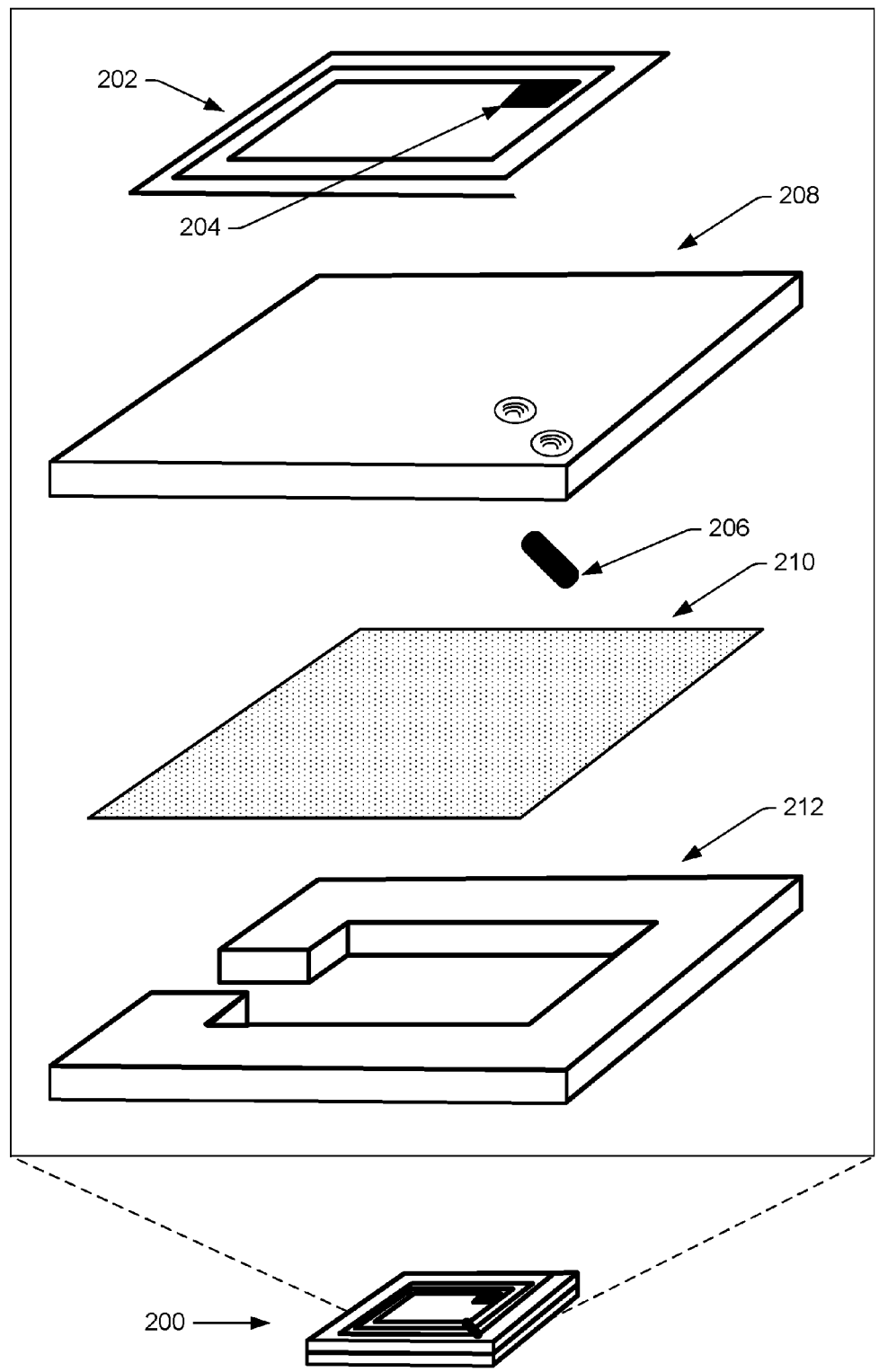
FIG. 2 shows an expanded view of an example RFID tag that includes the capacitive shield. Here, the capacitive shield comprises a C-shaped layer of conductive material, such as metal. The C-shape of the capacitive shield provides enough surface area to allow the shield to capacitively couple to the antenna at high frequencies, while also preventing or lessening the formation of Eddy currents at the high frequencies.

FIG. 2 shows an expanded view of an example RFID tag that includes the capacitive shield. Here, the capacitive shield comprises a C-shaped layer of conductive material, such as metal. The C-shape of the capacitive shield provides enough surface area to allow the shield to capacitively couple to the antenna at high frequencies, while also preventing or lessening the formation of Eddy currents at the high frequencies.

As illustrated, the RFID tag 200 includes an antenna (or antenna trace) 202 having multiple loops in a spiral pattern. The antenna also couples to an IC 204 and to a jumper 206 that couples the ends of the antenna 202 through holes in the substrate 208, thus closing the circuit. The RFID tag further includes the substrate 208 having a top surface and a bottom surface. In this example, the antenna 202 bonds to the top surface of the substrate 208. Further, the RFID tag 200 includes a capacitive shield 212 to make the RFID tag safe in high-frequency environments, such as microwaves. In this example, the capacitive shield 212 is in the form of a C-shape which couples to the bottom surface of the substrate 208 via an adhesive layer 210. While these examples describe the adhesive layer bonding the capacitive shields to the substrate 208, in some instances the capacitive shield may couple to the substrate via a chemical bond or the like. Further, while these examples illustrate the dedicated jumper 206, in other instances the capacitive shield may function as the jumper 206.

As discussed above, the capacitive shield 212 may be formed from an array of materials, such as metals (e.g., copper, nickel, aluminum, etc.), silicon, a metal-particulate glue, or other materials having an electrical conductance that is greater than an electrical-conductance threshold (e.g., greater than approximately $1.00 \times 10^7$ Siemens at 20° Celsius). In some instances, the selected material may also have a thermal conductance that is greater than a thermal-conductance threshold.

As illustrated, the C-shape of the capacitive shield 212 aligns with the loops of the antenna 202. That is, the material of the capacitive shield 212 may reside in-line with (underneath) a portion of the loops of the antenna. For instance, the capacitive-shield material may reside underneath a majority of the material of the antenna. Further, because the capacitive shield 212 includes a slot (of the C-shape), a portion of the loops of the antenna does not align with material of the capacitive shield 212. In this example, the slot of the "C" leads to a window within the "C", which corresponds with (i.e., aligns with) a portion of the substrate 208 of the tag 200 that does might not include loops of the antenna 202. Stated otherwise, material of the C-shape of the capacitive shield 212 resides beneath a first portion of the substrate 208 that includes the antenna 202, while a window defined by the C-shape of the capacitive shield 212 (i.e., the middle of the "C") resides beneath a second portion of the substrate 208 that does not include the antenna 202.

The capacitive shield 212 may have a surface area that is substantially greater (e.g., 10 times greater, 50 times greater, 100 times greater, etc.) than the surface area of the antenna 202. As such, at high frequencies, the capacitive shield 212 may capacitively couple to the antenna and thus, may receive energy from the antenna 202. Given the relatively large surface area of the capacitive shield 212 and its thermal conductivity, the capacitive shield 212 may dissipate the energy received from the antenna as heat into an ambient environment of the RFID tag 200 (e.g., within the microwave). Further, given that the substrate 208 resides between the antenna 202 and the capacitive shield 212, the capacitive shield 212 does not disrupt normal operation of the antenna 202 at frequencies utilized by RFID readers. Finally, while not illustrated, in some instances the RFID tag 200 may include one or more additional adhesive layers on top or bottom for coupling the RFID tag to an item, such as one of the inventory items illustrated in FIG. 1.

Figure 3:
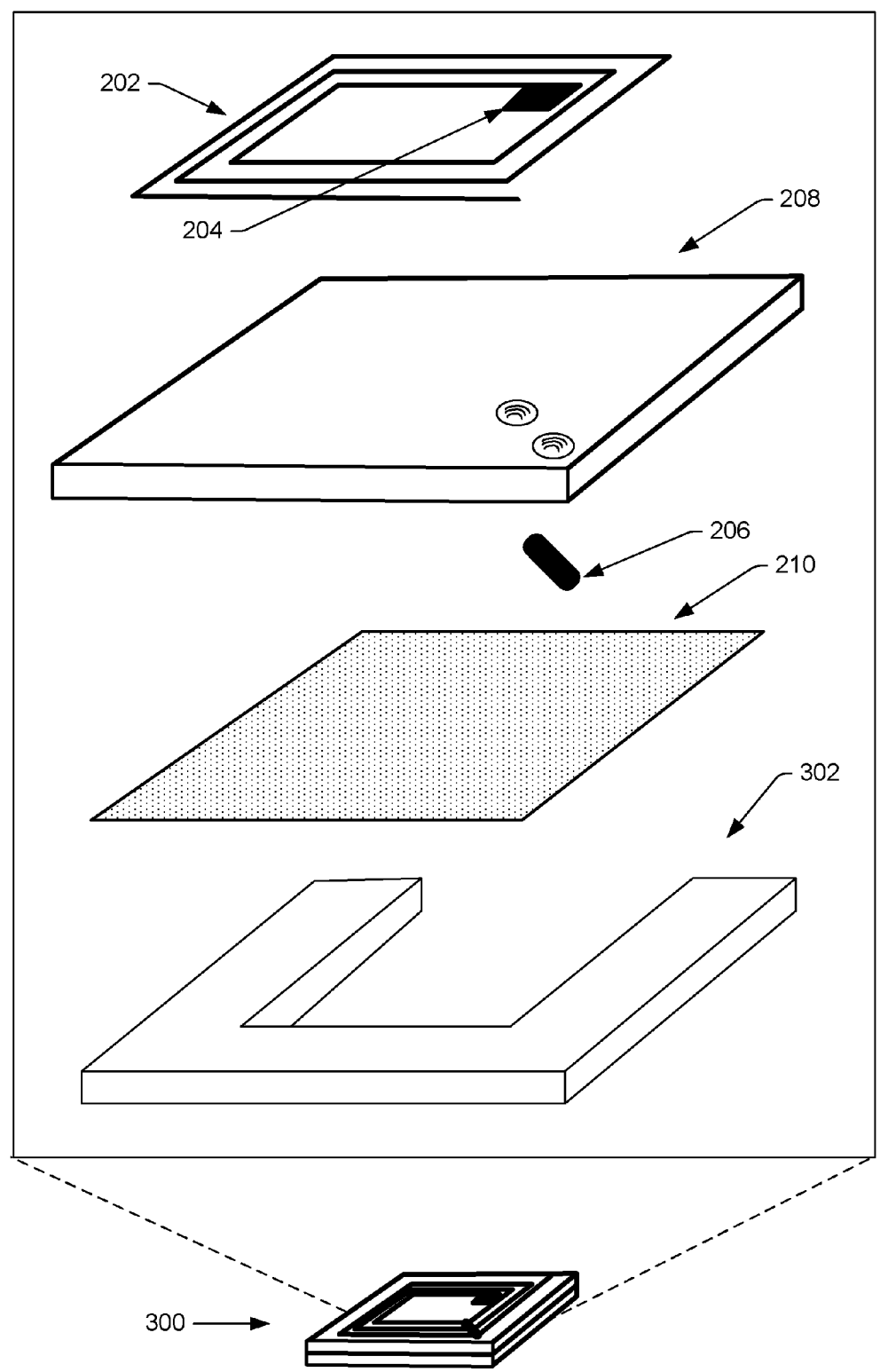
FIG. 3 shows an expanded view of an example RFID tag that includes the capacitive shield. Here, the capacitive shield comprises a U-shaped layer of conductive material, such as metal. Like the C-shape of FIG. 2, the U-shape of the capacitive shield provides enough surface area to allow the shield to capacitively couple to the antenna at high frequencies, while also preventing or lessening the formation of Eddy currents at the high frequencies.

FIG. 3 shows an expanded view of an example RFID tag 300 that includes a capacitive shield 302. Here, the capacitive shield comprises a U-shaped layer of conductive material, such as metal. Like the C-shape of FIG. 2, the U-shape of the capacitive shield 302 provides enough surface area to allow the shield to capacitively couple to the antenna 202 at high frequencies, while also preventing or lessening the formation of Eddy currents at the high frequencies. Further, while FIG. 3 illustrates the "U" shape, in other instances the conductive shield 212 may be formed of two U-shapes that are mirror images, resulting in two slots between where the top of the U's meet, rather than the single slot at the top of the "U" as shown in FIG. 3. Further, and as discussed above with reference to FIG. 2, material of the U-shape of the capacitive shield 302 resides beneath a first portion of the substrate 208 that includes the antenna 202, while a window defined by the U-shape of the capacitive shield 302 (i.e., the middle of the "U") resides beneath a second portion of the substrate 208 that does not include the antenna 202.

Figure 4:
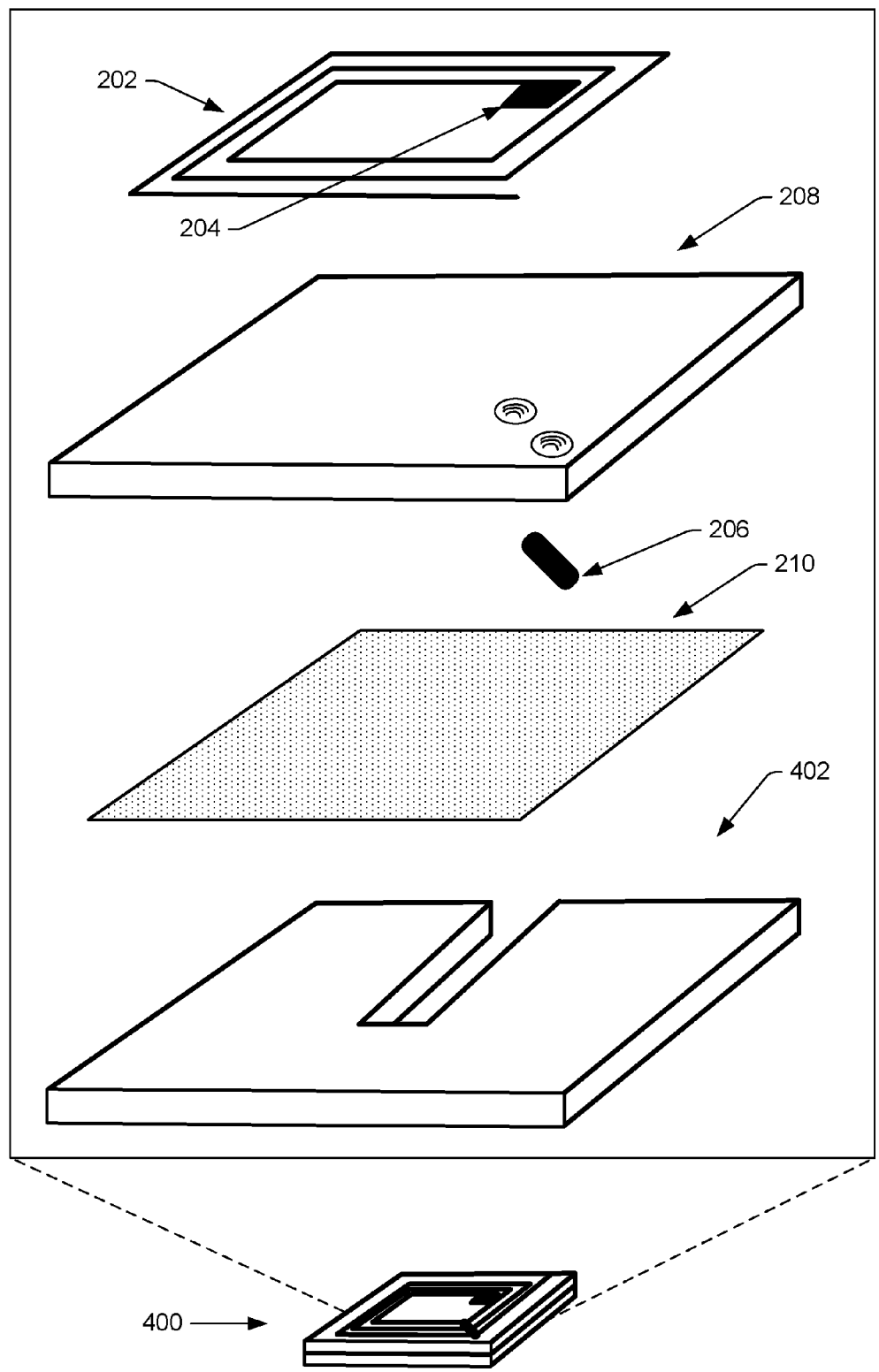
FIG. 4 shows an expanded view of an example RFID tag that includes the capacitive shield. Here, the capacitive shield includes a slot that, like the previous shield shapes, provides enough surface area to allow the shield to capacitively couple to the antenna at high frequencies, while also preventing or lessening the formation of Eddy currents at the high frequencies.

FIG. 4 shows an expanded view of another example RFID tag 400 that includes a capacitive shield 402. Here, the capacitive shield 402 includes a slot that, like the previous shield shapes, provides enough surface area to allow the shield to capacitively couple to the antenna at high frequencies, while also preventing or lessening the formation of Eddy currents at the high frequencies. That is, while the capacitive shield 402 still resembles a "U" shape, the capacitive shield 402 may be formed by forming a rectangular shape of the capacitive-shield material and then creating a slot beginning at one side of the material and ending towards a middle of the material. Further, while FIG. 4 illustrates a slot in the capacitive shield that is substantially orthogonal to an edge of the shield, in some instances the slot may be created at a different angle relative to the edge of the shield, such as at a 45° angle or the like. Further, while the illustrated slot is shown as rectangular, the slot may be wedge-shaped or may have any other shape in other implementations.

Figure 5:
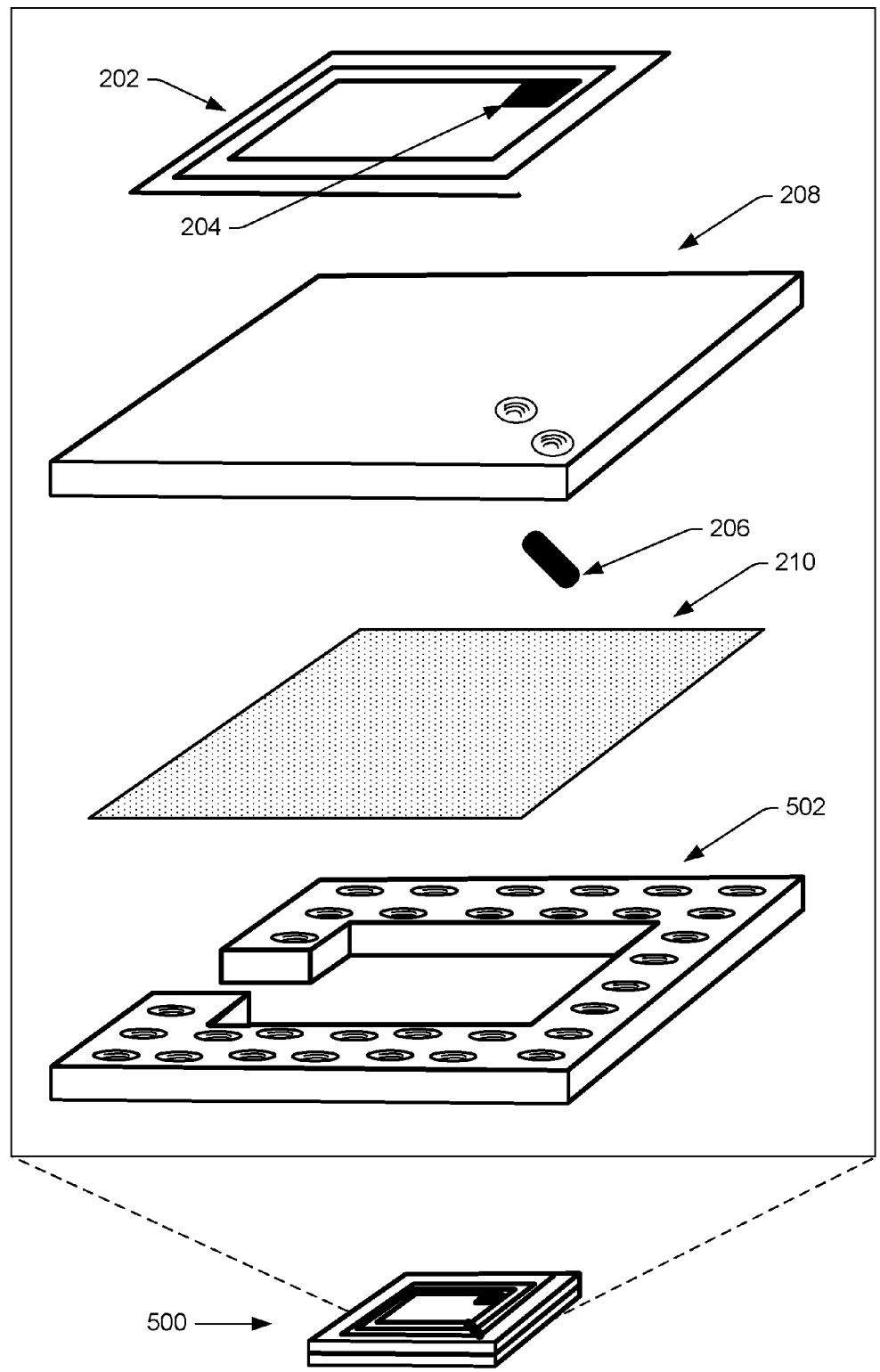
FIG. 5 shows an expanded view of an example RFID tag that includes the capacitive shield. Here, the capacitive shield comprises a layer of patterned conductive material (in this case, in the form of a "C"). Again, this shape of the capacitive shield provides enough surface area to allow the shield to capacitively couple to the antenna at high frequencies, while also preventing or lessening the formation of Eddy currents at the high frequencies. Further, because the conductive material is pattern the amount of material and, hence, the weight and cost of the resulting RFID tag, may be lessened.

FIG. 5 shows an expanded view of yet another example RFID tag 500 that includes a capacitive shield 502. Here, the capacitive shield 502 comprises a layer of patterned conductive material (in this case, in the form of a "C"). Again, this shape of the capacitive shield 502 provides enough surface area to allow the shield to capacitively couple to the antenna at high frequencies, while also preventing or lessening the formation of Eddy currents at the high frequencies. Further, because the conductive material is patterned the amount of material and, hence, the weight and cost of the resulting RFID tag, may be lessened. Further, while FIG. 5 shows the capacitive shield 502 in the form of a "C", the technique of creating a capacitive shield from patterned material may apply to any other shape, discussed herein or otherwise.

Figure 6:
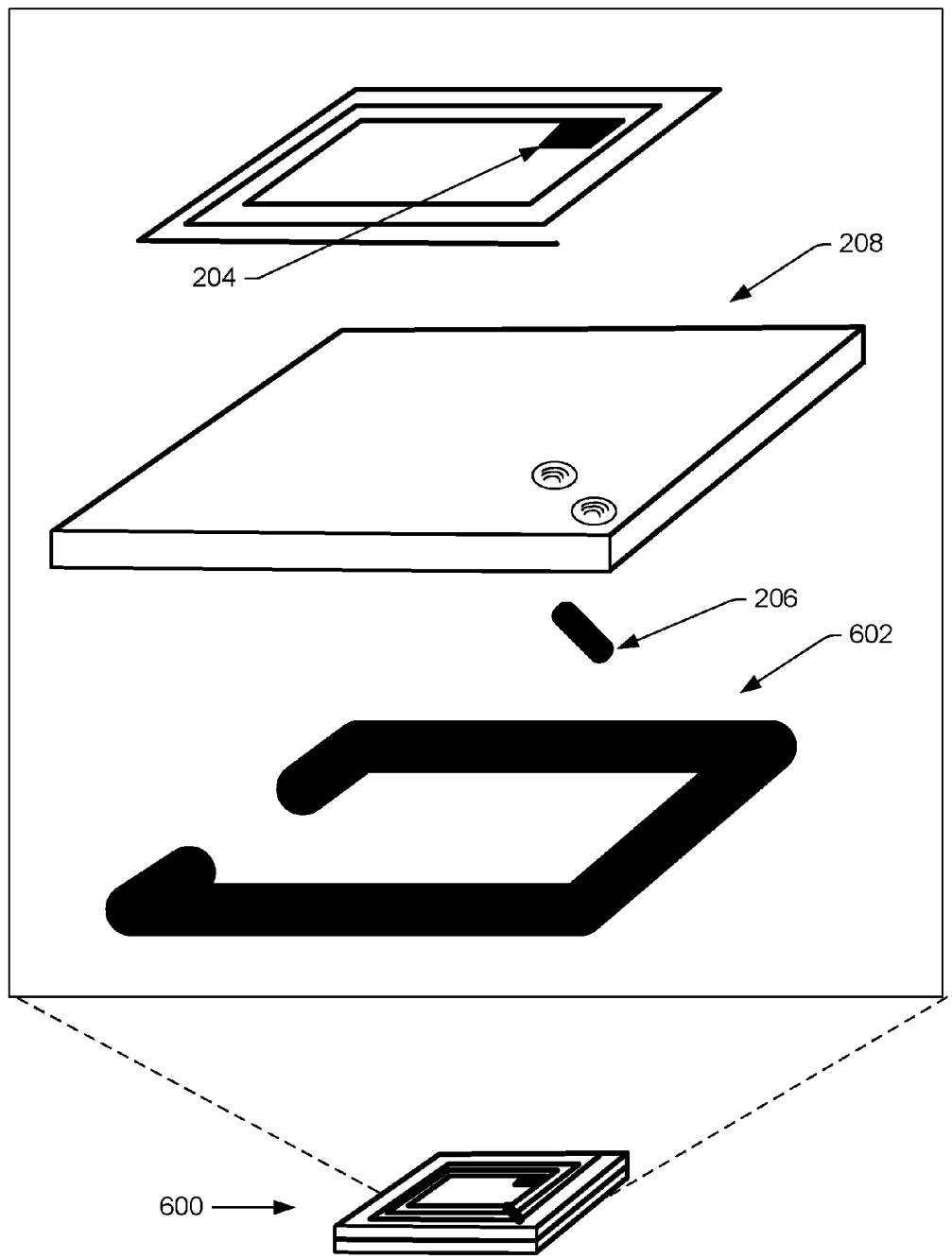
FIG. 6 shows an expanded view of an example RFID tag that includes the capacitive shield. Here, the capacitive shield comprises a metal particulate adhesive (in this case, in the form of a "C"). Again, the shape and conductivity of this capacitive shield provides enough surface area to allow the shield to capacitively couple to the antenna at high frequencies, while also preventing or lessening the formation of Eddy currents at the high frequencies.

FIG. 6 shows an expanded view of another example RFID tag 600 that includes a capacitive shield 602. Here, the capacitive shield comprises a metal particulate adhesive (in this case, in the form of a "C"). In this example, because the conductive material (metal) is found in an adhesive, the RFID tag 602 may be free from the adhesive layer 210. Further, the shape and conductivity of this capacitive shield provides enough surface area to allow the shield to capacitively couple to the antenna at high frequencies, while also preventing or lessening the formation of Eddy currents at the high frequencies. Again, while FIG. 6 shows the capacitive shield 602 in the form of a "C", the technique of creating a capacitive shield from metal particulate adhesive may apply to any other shape, discussed herein or otherwise.

Figure 7:
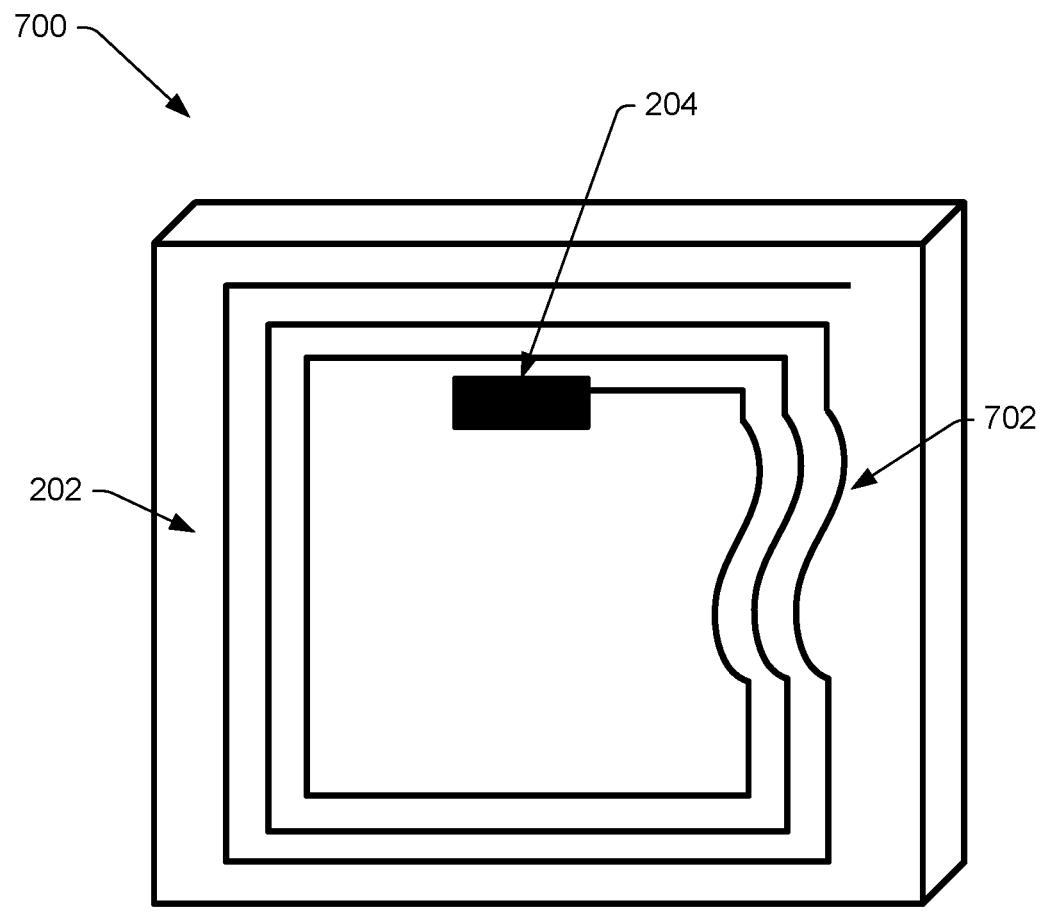
FIG. 7 shows a top view of an example RFID tag that does not include a capacitive shield, but whose antenna instead includes a section that is non-linear (e.g., in the form of a sine wave, square wave, etc.). Here, the "wiggles" in the antenna introduce relatively high impedance at high-frequency levels, thus causing the RFID tag to act like an open circuit and, hence, avoid arcing, while having negligible effect at lower-frequency levels used by RFID readers. As such, the resulting RFID tag may receive and transmit responses to and from RFID readers, while refraining from arcing when in a microwave and other high-frequency environments.

FIG. 7 shows a top view of an example RFID tag 700 that may or may not include a capacitive shield, but whose antenna 202 instead includes a section 702 that is non-linear (e.g., in the form of a sine wave, square wave, etc.), potentially in addition to one or more sections that are linear. Here, the "wiggles" in the antenna introduce relatively high impedance at high-frequency levels, thus causing the RFID tag to act like an open circuit and, hence, avoid arcing, while having negligible effect at lower-frequency levels used by RFID readers. As such, the resulting RFID tag may receive and transmit responses to and from RFID readers, while refraining from arcing when in a microwave and other high-frequency environments.

Figure 8A:
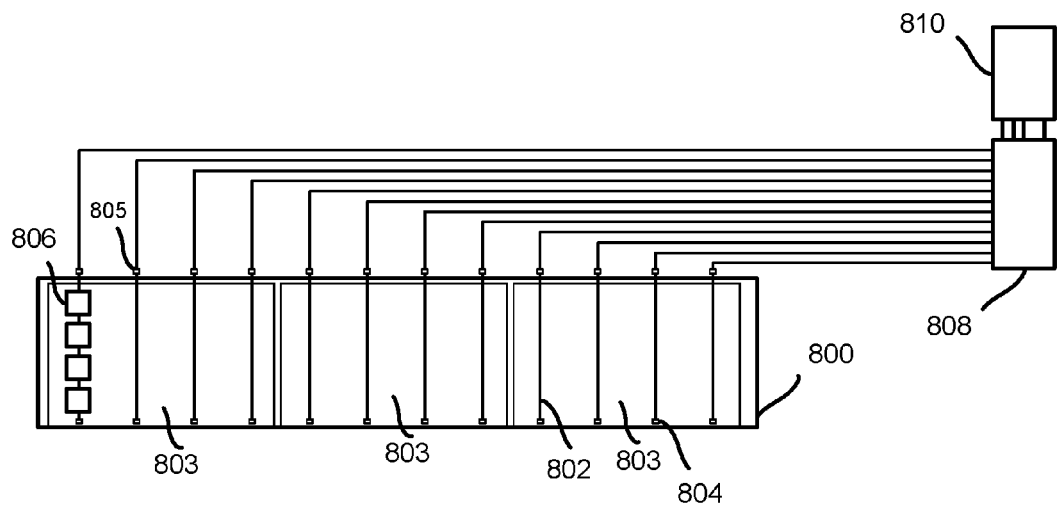
FIGS. 8A-C collectively show an example RFID system configuration in which antennas of an RFID reader are embedded within a shelf on which inventory items may rest. The inventory items may couple to respective RFID tags that interact with the RFID reader.

FIG. 8A is a top-down illustration of an antenna embedded inventory shelf 800, representing one environment that may include the RFID tags described herein. The antenna-embedded inventory shelf 800 includes a plurality of antenna elements 802 of an RFID reader, with the antenna elements 802 positioned along the antenna-embedded inventory shelf 800. For example, two or more of the antenna elements 802 may be substantially parallel to each other and extend from the rear or back of the substrate toward the front of the substrate. In this example, there are twelve antenna elements 802. In other implementations, there may be fewer or additional antenna elements 802 included in the antenna embedded inventory shelf 800.

The spacing or separation between the antenna elements may be uniform across the antenna embedded inventory shelf 800 and/or may vary based on the size, type and/or number of inventory items 806 that may be placed on the antenna embedded inventory shelf 800. For example, the antenna elements may be spaced between approximately two inches and approximately six inches to accommodate different sizes of inventory items 806. In other implementations, the antenna elements may be included in a prefabricated sheet or set of antenna elements, such as antenna element sheets 803, each of which include four equally spaced antenna elements. The antenna element sheets may be placed adjacent to one another along the antenna embedded inventory shelf 800. To vary antenna element spacing along the antenna embedded inventory shelf 800, antenna element sheets having antenna elements with different spacings may be placed on the antenna embedded inventory shelf 800.

In one implementation, the antenna elements 802 are positioned on the antenna embedded inventory shelf 800 so that items placed on the antenna embedded inventory shelf 800 are positioned above each antenna element. For example, each row of inventory items 806 may be positioned over an antenna element 802. By positioning the inventory items over the antenna elements 802, RFID tags attached to or included in the inventory items may be energized by an antenna element 802. In some implementations, when an antenna element and/or RFID reader receives an RFID tag identifier from an RFID tag, it may associate the RFID tag identifier with the receiving antenna element. For example, each antenna element may include a unique position on the antenna embedded inventory shelf 800 and/or have a corresponding unique identifier. When the RFID tag identifier is received and added to an inventory table, the corresponding antenna location and/or antenna unique identifier may be associated with the RFID tag identifier and stored in the inventory table. Associating the RFID tag identifier and the antenna location and/or antenna unique identifier provides both location information for the inventory item associated with the RFID tag identifier and identifies the antenna element 802 that is to be excited to poll the RFID tag.

The antenna elements may be any type of antenna element capable of generating a field that can be used to energize an RFID tag so that communication with the RFID tag is enabled. For example, each antenna element may be a planar radiating transmission line. In other implementations, the antenna element may be another form of antenna, such as an omnidirectional antenna. In some implementations, the antenna elements may be configured to operate in both near field mode and far field mode. In near field, or magnetic mode, the magnetic fields generated by the antenna elements may be used to excite RFID tags within the field and read RFID tag identifiers stored on those RFID tags. For example, near field RFID tags may be placed in close proximity to the antenna elements by affixing them to the base of items. The near field RFID tags rely on magnetic coupling between the field of the antenna element and an RFID tag antenna to close the communication link so that the RFID tag identifier of the RFID tag can be read. Near field or magnetic mode is beneficial when dealing with items that are liquid filled, have a high dielectric constant or are a combination of both. Near field mode is also advantageous when a well-defined, constrained read zone is desired. This is due to the magnetic field strength falling off quickly with distance from the antenna element. In far field, or electric mode, far field tags within the field of the antenna element may also be excited and read.

Each antenna element may be terminated by a load resistor 804 in the characteristic impedance of the antenna element to reduce standing waves and improve the uniformity of field coverage of the field generated by the antenna element 802. The opposing end of each antenna element may, likewise, be coupled to a multiplexer 808. The multiplexer is coupled to and controlled by an RFID reader 810 that is configured to energize the antenna elements 802 and may be utilized with the implementations discussed herein. For example, the RFID reader 810 may control the multiplexer 808 to select one or more antenna elements 802 to energize to perform a targeted read mode. In another example, the RFID reader 810 may control the multiplexer 808 to select and energize all of the antenna elements 802 to perform an inventory read mode, as discussed below.

The RFID reader may receive instructions from an inventory management system to perform the operations discussed herein. For example, the inventory management system may receive instructions to scan for RFID tag identifiers. In response, the RFID tag identifier will scan for RFID tag identifiers using an antenna element and provide the received RFID tag identifiers to the inventory management system.

While the example configuration illustrated in FIG. 8A identifies the multiplexer 808 as separate from the RFID reader 810, in other implementations, the multiplexer may be incorporated into the RFID reader 810.

In some implementations, each antenna element 802 may also include a matching circuit 805. The matching circuit may be used to determine the return power of the antenna element and/or to dynamically tune the antenna element. In some implementations, the matching circuit 805 may include adjustable capacitors and fixed inductors that can be adjusted to dynamically modify the impedance of the antenna element 802.

Figure 8B:
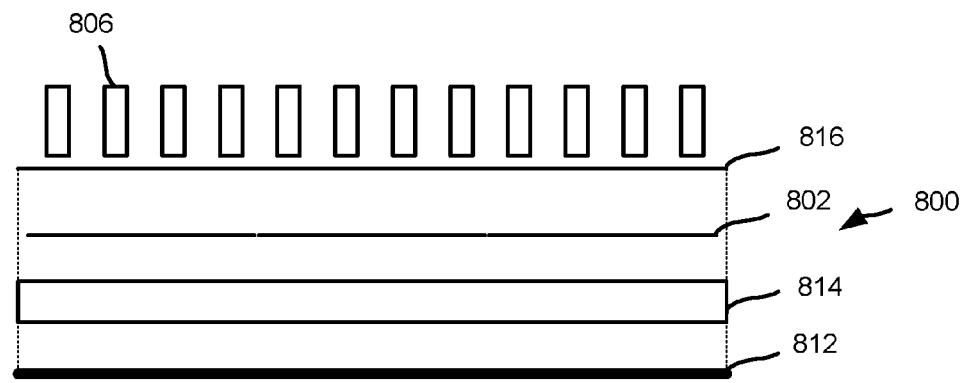

FIG. 8B is cross sectional view of the antenna embedded inventory shelf 800, which each component of the antenna embedded inventory shelf separated for purposes of illustration, according to an implementation. In the illustrated implementation, the antenna embedded inventory shelf 800 includes a ground plane 812, a substrate 814, antenna elements 802 and a protective cover 816. The ground plane 812 may be formed of any conductive material that can provide a common ground for the antenna embedded inventory shelf 800. The ground plane may be formed of any conductive material, such as metal, and may be of any thickness.

In one implementation, the ground plane 812 is shelf of a standard gondola shelf system. A gondola shelf system typically includes a flat base and a vertical component featuring notches, pegboards, or slatwalls. The vertical pieces are fitted with shelves, such as metal shelves, to support inventory items. Gondolas placed end-to-end can form rows of shelving. For example, an existing gondola shelf system located in a materials handling facility can be converted into an antenna embedded inventory shelf 800 by utilizing the existing gondola shelf as the ground plane 812 of the antenna embedded inventory shelf 800.

Adjacent to the ground plane 812 is a substrate 814 formed from a material having a low dielectric constant with respect to other materials. The substrate 814 may be coupled to the ground plane (permanently or temporarily), removably placed on the ground plane, etc. For example, if the ground plane is a metal shelf, the substrate 814 may be placed on the shelf. The substrate 814 may be formed of any low dielectric constant material, such as, but not limited to, acrylonitrile butadiene styrene ("ABS"), polystyrene, polyvinyl chloride ("PVC"), high-density polyethylene ("HDPE"), low-density polyethylene ("LDPE"), etc. The substrate is configured to improve the field above the antenna embedded inventory shelf 800 generated by the antenna elements 802 and to prevent or reduce field below the antenna embedded inventory shelf 800. The substrate 814 is of a sufficient thickness to provide support to the antenna embedded inventory shelf 800 and improve the field above the antenna embedded inventory shelf 800. Generally, the substrate 814 may be at least approximately one-quarter of an inch thick. In one implementation, the substrate is approximately three-eighths of an inch thick.

Each of the antenna elements 802 are embedded into the top of the substrate 814, placed onto the top of the substrate 814, and/or affixed to the top of the substrate 814. For example, the antenna elements may be provided in fabricated sheets 803 with an adhesive back that are affixed to the top of the substrate 814. In other implementations, the antenna elements may be incorporated into printed circuits, provided as adhesive copper tape, etc., that are affixed to the top of the substrate 814. In still other implementations, the substrate 814 may be cut or etched and the antenna elements 802 incorporated into the top of the substrate 814. In the example illustrated in FIGS. 8A-C, the antenna elements 802 are incorporated into fabricated sheets 803 that are affixed to the top of the substrate 814.

Finally, a protective cover 816 is affixed over the top of the antenna elements 802 and/or substrate 814 to provide a protective surface between the antenna elements 802 and inventory items that are placed onto the inventory shelf. The protective cover 816 may be formed of any material. In some implementations, the protective cover 816 is formed of the same material as the substrate 814. For example, the protective cover may be ABS, polystyrene, PVC, HDPE, LDPE, etc. The protective cover 816 may be any thickness sufficient to protect the antenna elements 802. For example, in some implementations, the protective cover 816 is approximately one-sixteenth of an inch thick.

In some implementations, the protective cover 816 may be formed of a porous plastic that is approximately 50% plastic and 50% air to provide a separation between the antenna elements 802 and the inventory items 806. For example, the protective cover 816 may be approximately one-quarter of an inch thick. Separating the antenna elements 802 and the inventory items 806 using a porous plastic protective cover 816 reduces detuning caused by the inventory items. While this example describes the use of a porous plastic, in other implementations, other materials may likewise be utilized.

Figure 8C:
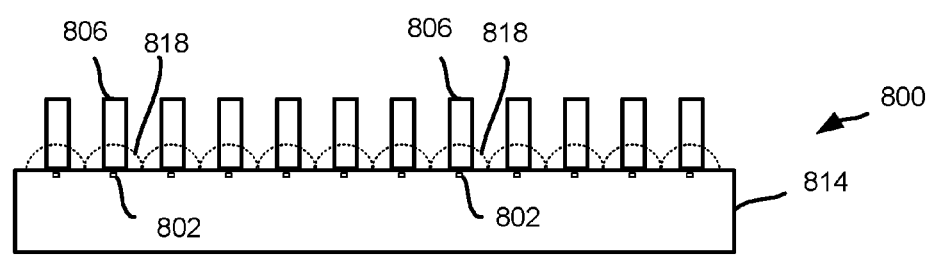

FIG. 8C is a side view of an antenna embedded inventory shelf 800, according to an implementation. As illustrated, when an antenna element 802 is excited, it generates a field 818, such as a magnet field or an electric field. For example, the antenna element 802 may generate a magnetic field for use in reading RFID tags. By positioning the antenna elements 802 along the shelf, inventory items 806 may be placed in rows on the shelf and the RFID tags attached to the inventory items 806 will be located in at least one field generated by the antenna elements 802 so that the RFID tag can be read and the item identified.

Utilization of the substrate 814 promotes the field 818 generated by the antenna elements 802 in a direction above the antenna embedded inventory shelf 800 and hinders propagation of the field below the antenna embedded inventory shelf 800, thereby reducing or prohibiting the reading of RFID tags located below the antenna embedded inventory shelf 800.

The fields 818 generated by the antenna elements 802 may have a footprint between approximately one inch and approximately six inches. Likewise, the antennas may be positioned or tuned so that the fields 818 generated by the antenna elements 802 overlap, to prevent locations on the antenna embedded inventory shelf 800 where an RFID tag is not readable by at least one antenna element 802.

While FIGS. 8A-C illustrate one possible implementation of an RFID reader and tag system usable herein, it is to be appreciated that any other type of RFID reader may be employed.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A radio-frequency identification (RFID) tag comprising:
   a substrate having a top surface and a bottom surface;
   an antenna, residing on the top surface of the substrate in a spiral pattern;
   a jumper, residing on the bottom surface of the substrate and coupling a first end of the antenna with a second end of the antenna;
   an integrated circuit (IC) coupled to the antenna;
   an adhesive layer residing on the bottom surface of the substrate; and
   a metal layer, coupled to the bottom surface of the substrate via the adhesive layer, the metal layer having a slot that leads to an opening in the metal layer that is larger than the slot such that material of the metal layer resides beneath a first portion of the substrate on which the antenna resides and the opening in the metal layer resides beneath a second portion of the substrate that does not include at least a portion of the antenna.

2. An RFID tag as recited in claim 1, wherein the antenna comprises a first portion that is substantially linear and a second portion having a substantial sine-wave shape.

3. A radio-frequency identification (RFID) tag, comprising:
   a substrate having a top surface and a bottom surface;
   an antenna, coupled to the top surface of the substrate; and
   a conductive layer coupled to at least one of the top surface or the bottom surface of the substrate, wherein the conductive layer includes a slot such that a first portion of the antenna resides over the conductive layer but a second portion of the antenna does not reside over the conductive layer, and wherein the slot of the conductive layer leads into an opening in the conductive layer that is larger than the slot, at least a portion of the opening corresponding to at least a portion of the substrate on which at least a portion of the antenna does not reside.

4. An RFID tag as recited in claim 3, further comprising an adhesive layer coupled to the bottom surface of the substrate, and wherein the conductive layer is coupled to the bottom surface of the substrate via the adhesive layer.

5. An RFID tag as recited in claim 3, wherein the conductive layer is coupled to the top surface of the substrate, and further comprising an insulating layer between the conductive layer and the antenna.

6. An RFID tag as recited in claim 3, further comprising a jumper that couples a first end of the antenna with a second end of the antenna, and wherein the jumper resides at least partly over the conductive layer.

7. An RFID tag as recited in claim 3, further comprising a jumper that couples a first end of the antenna with a second end of the antenna, and wherein the conductive layer is substantially C-shaped, G-shaped, H-shaped, or U-shaped and material of the substantially C-shaped, G-shaped, H-shaped, or U-shaped conductive layer resides below the jumper.

8. An RFID tag as recited in claim 3, wherein the conductive layer capacitively couples to the antenna in response to the RFID tag being exposed to electromagnetic energy having a frequency that is approximately equal to 2.5 Gigahertz and does not capacitively couple to the antenna in response to the RFID tag being exposed to electromagnetic energy having a frequency that is approximately equal to 14 Megahertz.

9. An RFID tag as recited in claim 3, wherein the conductive layer capacitively couples to the antenna in response to the RFID tag being exposed to electromagnetic energy having a frequency that is greater than a frequency threshold, the conductive layer converting the electromagnetic energy into thermal energy such that the thermal energy dissipates from the conductive layer into an ambient environment of the RFID tag.

10. An RFID tag as recited in claim 3, wherein the antenna comprises a first portion that is substantially linear and a second portion having a substantial sine-wave shape.

11. A radio-frequency identification (RFID) tag, comprising:
a substrate having a top surface and a bottom surface;
an antenna, coupled to the top surface of the substrate; and
a conductive layer coupled to at least one of the top surface or the bottom surface of the substrate to capacitively couple to the antenna in response to the RFID tag being exposed to electromagnetic energy having a frequency that is greater than a frequency threshold, the conductive layer converting the electromagnetic energy into thermal energy such that the thermal energy dissipates from the conductive layer into an ambient environment of the RFID tag, wherein the conductive layer includes a slot such that a first portion of the antenna resides over the conductive layer but a second portion of the antenna does not reside over the conductive layer, the slot leading into an opening in the conductive layer, the opening being larger than the slot and at least a portion of the opening corresponding to at least a portion of the substrate that does not include at least a portion of the antenna.

12. An RFID tag as recited in claim 11, further comprising a jumper that couples a first end of the antenna with a second end of the antenna, wherein the jumper resides at least partly over the conductive layer.

13. An RFID tag as recited in claim 11, further comprising a jumper that couples a first end of the antenna with a second end of the antenna, and wherein the conductive layer is substantially C-shaped, G-shaped, H- shaped, or U-shaped and material of the substantially C-shaped, G-shaped, H-shaped, or U-shaped conductive layer resides below the jumper portion of the antenna.

14. An RFID tag as recited in claim 11, wherein the conductive layer capacitively couples to the antenna in response to the RFID tag being exposed to electromagnetic energy having a frequency that is approximately equal to 2.5 Gigahertz and does not capacitively couple to the antenna in response to the RFID tag being exposed to electromagnetic energy having a frequency that is approximately equal to 14 Megahertz.

15. An RFID tag as recited in claim 11, wherein the conductive layer has a value of electrical conductance that is greater than approximately $1.00 \times 10^7$ Siemens at 20° Celsius.

16. An RFID tag as recited in claim 11, wherein the conductive layer comprises one or more of metal, silicon, germanium, carbon, or conductive particulate glue.

17. An RFID tag as recited in claim 11, wherein the antenna comprises a first portion that is substantially linear and a second portion having a substantial sine-wave shape.

18. A radio-frequency identification (RFID) tag, comprising:
a substrate having a top surface and a bottom surface;
an antenna, coupled to the top surface of the substrate; and
a conductive layer coupled to at least one of the top surface or the bottom surface of the substrate to capacitively couple to the antenna in response to the RFID tag being exposed to electromagnetic energy having a threshold frequency, wherein the conductive layer includes a slot such that a first portion of the antenna resides over the conductive layer but a second portion of the antenna does not reside over the conductive layer.

19. The RFID tag as recited in claim 18, wherein the conductive layer is further to convert the electromagnetic energy into thermal energy such that the thermal energy dissipates from the conductive layer into an ambient environment of the RFID tag.

* * * * *